United States Patent [19]

De Yoreo

[11] 4,182,069

[45] Jan. 8, 1980

[54] APPARATUS FOR ELECTRICALLY EXTERMINATING INSECTS

[75] Inventor: Sal G. De Yoreo, Andover, Mass.

[73] Assignee: Automatic Radio Mfg. Co., Inc., Melrose, Mass.

[21] Appl. No.: 809,971

[22] Filed: Jun. 28, 1977

[51] Int. Cl.² .................. A01M 1/04; A01M 1/22
[52] U.S. Cl. ........................................ 43/112; 43/113
[58] Field of Search ................................ 43/112, 113

[56] References Cited

U.S. PATENT DOCUMENTS

| | | | |
|---|---|---|---|
| 1,848,614 | 3/1932 | Folmer | 43/112 |
| 1,936,468 | 11/1933 | Folmer | 43/112 |
| 3,823,506 | 7/1974 | Iannini | 43/112 |
| 3,894,351 | 7/1975 | Iannini | 43/112 |
| 3,950,886 | 4/1976 | Newhall | 43/112 |
| 3,986,292 | 10/1976 | Klebanoff | 43/112 |
| 4,121,371 | 10/1978 | Kaphengst | 43/112 |

*Primary Examiner*—Nicholas P. Godici

*Attorney, Agent, or Firm*—Thompson, Birch, Gauthier & Samuels

[57] ABSTRACT

An apparatus for electrically exterminating insects comprises first and second perforated electrically conductive elements supported in a mutually spaced relationship by insulators which are in turn supported on opposed top and bottom walls. A perforated side wall extends between the top and bottom walls and cooperates therewith to form a protective housing enclosing the first and second conductive elements. The top wall has an access opening therein leading to an interior chamber surrounded by the first conductive element. A carrier having at least one fluorescent light source mounted thereon is detachably mounted on the top wall with the light source protruding through the access opening into the aforesaid interior chamber. The light source and the first and second electrically conductive elements are connected to an electrical power cord by electrical components mounted on both the carrier and the top wall. A protective cover is detachably mounted in an operative position overlying the aforesaid electrical components.

6 Claims, 5 Drawing Figures

APPARATUS FOR ELECTRICALLY EXTERMINATING INSECTS

FIELD OF THE INVENTION

This invention relates to an apparatus for electrically exterminating insects.

BACKGROUND OF THE INVENTION

Devices for electrically exterminating insects are now well known in the art as evidenced for example by the disclosures in U.S. Pat. Nos. 3,835,577 and 3,823,506. However, a number of problems are associated with such known devices. For examples, a number of protective housing components must first be removed in order to gain access to the fluorescent bulbs. When doing so, and in the event that the user inadvertently forgets to disconnect the device from the main power source, a serious shock hazard is presented because the interior components of such known devices remain "live" after the external protective housing components have been removed. Also, the fluorescent light sources in these known devices are not readily accessible and considerable time and effort must be expended when changes are required. Also, these known devices are characterized by relatively poor illuminating efficiency, which in turn adversely affects their ability to attract flying insects.

A general object of the present invention is the provision of an improved apparatus for electrically exterminating insects which avoids the above-mentioned problems.

A more specific object of the present invention is to provide an apparatus wherein electrical components are housed beneath a detachable protective cover, and wherein the electrical circuitry includes a normally open switch held closed by said cover. In the event that the cover is removed, the connection between the external power source and the interior electrical components of the apparatus is automatically broken, thereby minimizing the possibility of exposing the user to a shock hazard.

Another object of the present invention is to improve accessibility to the fluorescent high sources by mounting them on a carrier which is readily removable from the apparatus.

Another object of the present invention is to improve the lighting efficiency of the apparatus by employing a reflector to increase the amount of light projected from the apparatus by the fluorescent light sources.

A still further object of the present invention is the provision of an improved lighting arrangement employing U-shaped fluorescent tubes having their ends received in sockets underlying the aforesaid protective cover.

SUMMARY OF THE INVENTION

According to the present invention, there is provided an apparatus for electrically exterminating insects including a first conductive element surrounding an interior chamber and a second conductive element surrounding a first conductive element. The first and second conductive elements are fabricated of a perforated material such as for example a commercially available wire mesh, with the spacing between the wires being suitably dimensioned to perform the desired function. The conductive elements are held in a mutually spaced relationship by insulators which are in turn supported on top and bottom walls. A perforated side wall extends between the top and bottom walls to form a protective housing enclosing the conductive elements. The top wall has an access opening therein leading to the interior chamber surrounded by the first conductive element. A carrier is employed to carry at least one and preferably three fluorescent light tubes. The carrier is detachably mounted on the top wall with the fluorescent tubes protruding through the access opening into the interior chamber surrounded by the first conductive element. Electrical components are employed to connect the fluorescent tubes and the first and second conductive elements to an electrical power cord which is adapted to be received in a conventional electrical outlet. These electrical components are mounted at readily accessible positions on the carrier and the top wall. A protective cover is detachably mounted in an operative position overlying the aforesaid electrical components.

Preferably, the aforesaid electrical components are combined in a circuit which includes a normally open switch. The switch is held closed by the protective cover when it is in place. Removal of the cover results in an automatic opening of the switch, and this in turn breaks the connection between the power cord and the aforesaid electrical components.

Preferably, the fluorescent tubes are U-shaped with their ends received in sockets underlying the protective cover.

The aforesaid carrier preferably comprises a support plate having a reflector depending from the underside thereof. The fluorescent light tubes are supported by the support plate in positions directly adjacent to but spaced laterally from the reflector, thereby providing an arrangement which when viewed from the exterior of the apparatus, provides an apparently solid column of light.

The conductive elements and the side wall are preferably cylindrical. In addition, the top and bottom walls are preferably held in opposed relationship by rod members extending therebetween and located within the confines of the side wall. Preferably, the side walls is confined axially between the top and bottom walls and supported radially by the aforesaid rod members.

Preferably, the aforesaid electrical components include a voltage augmenting transformer mounted on the upper surface of the top wall and electrically connected to the first and second conductive elements. Additionally, a starter module and a ballast are associated with each fluorescent light tube. The starter module is mounted on the upper surface of the carrier's support plate and the ballast is mounted on the upper surface of the top wall. A detachable connection is provided between the starters and the ballasts to facilitate removal of the carrier from the apparatus when the need arises to change fluorescent tubes or to perform other maintenance or repairs.

DETAILED DESCRIPTION OF PREFERRED EMBODIMENT

Figure 1:
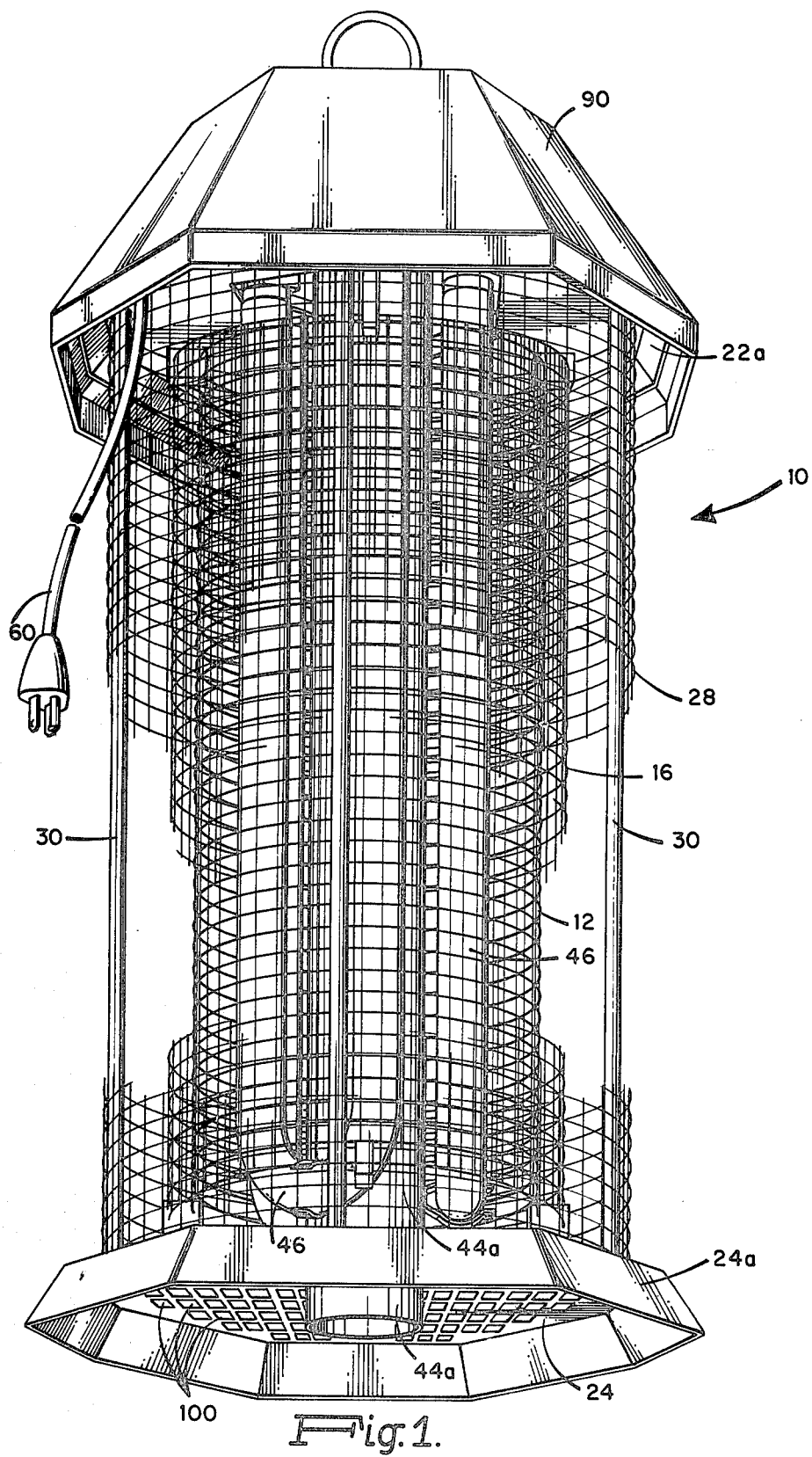
FIG. 1 is a view in perspective of a preferred embodiment of an apparatus in accordance with the present invention for electrically exterminating insects, with portions broken away.

Referring now to the drawings, there is shown a preferred embodiment of an apparatus for electrically exterminating insects generally indicated at 10. The apparatus has a first electrically conductive element 12 surrounding an interior chamber, and a second electrically conductive element 16 surrounding the first element. The first and second elements are preferably fabricated of a perforated material such as for example a commercially available wire mesh.

The elements 12 and 16 are held in a mutually spaced relationship by insulators 18a, 18b and 20a, 20b. The insulators 18a are supported on and depend downwardly from the underside of a top wall 22. Likewise, the insulators 18b are supported by and extend upwardly from a bottom wall 24. The insulators 18a, 18b are arranged at 180° intervals and are attached to their respective supporting walls by means of metal screws 26. The insulators 20a are located midway between the insulators 18a and they do not touch the top wall 22. Likewise, the insulators 20b are located midway between the insulators 18b and do not touch the bottom wall 24. Preferably, both walls 22, 24 are provided with downturned peripheral lips 22a, 24a.

A perforated side wall 28 extends between the top and bottom walls 22, 24 and cooperates therewith to form a protective housing enclosing the elements 12, 16. Preferably, the top and bottom walls 22, 24 are held in opposed spaced relationship by means of rod members 30 extending therebetween. This provides a rigid base structure and enables the side wall 28 to be wrapped around and to be radially supported by the rod members 30. The top wall 22 has an enlarged access opening 32 which leads to the interior chamber surrounded by the first element 12.

Figure 3:
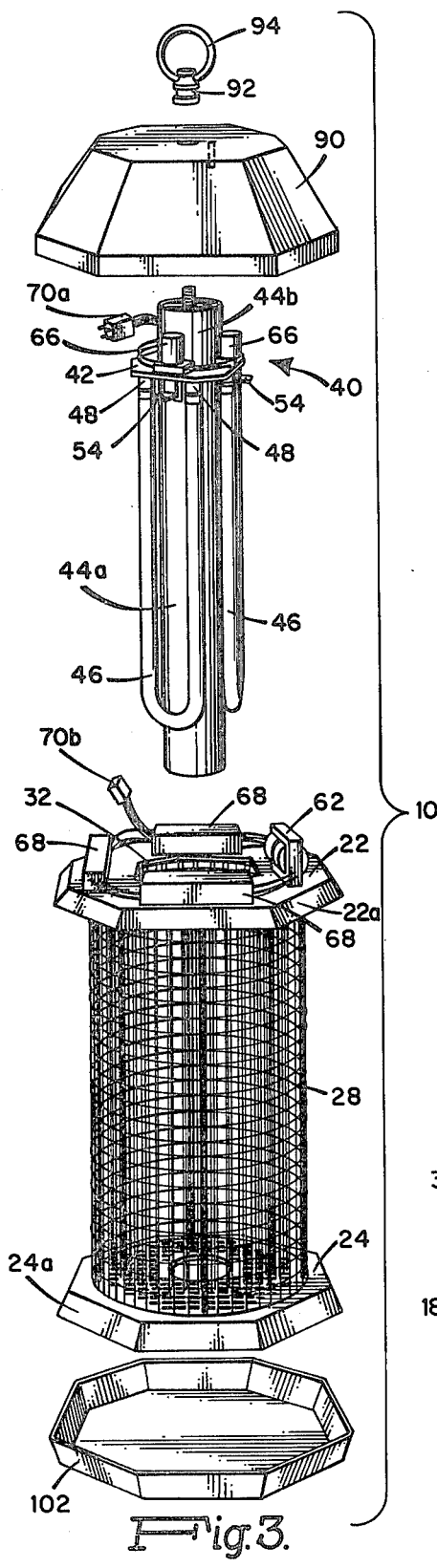
FIG. 3 is an exploded perspective view of the apparatus.

The apparatus further comprises a carrier generally indicated in FIG. 3 at 40. The carrier is comprised of a support plate 42 fixed relative to a tubular reflector 44 having a lower portion 44a depending from the underside of the support plate, and an upper portion 44b protruding thereabove. The carrier 40 has at least one and preferably a plurality of fluorescent light sources mounted thereon. In the preferred embodiment herein being described, these fluorescent light sources comprised U-shaped fluorescent tubes 46 which are arranged directly adjacent to but spaced laterally from the lower portion 44a of the reflector. The upper ends of the fluorescent tubes are electrically connected in sockets 48 depending from the underside of the carrier support plate 42. Each fluorescent tube 46 is further supported by means of a resilient clip 50 secured to and extending radially outwardly from the lower portion 44a of the reflector.

Figure 2:
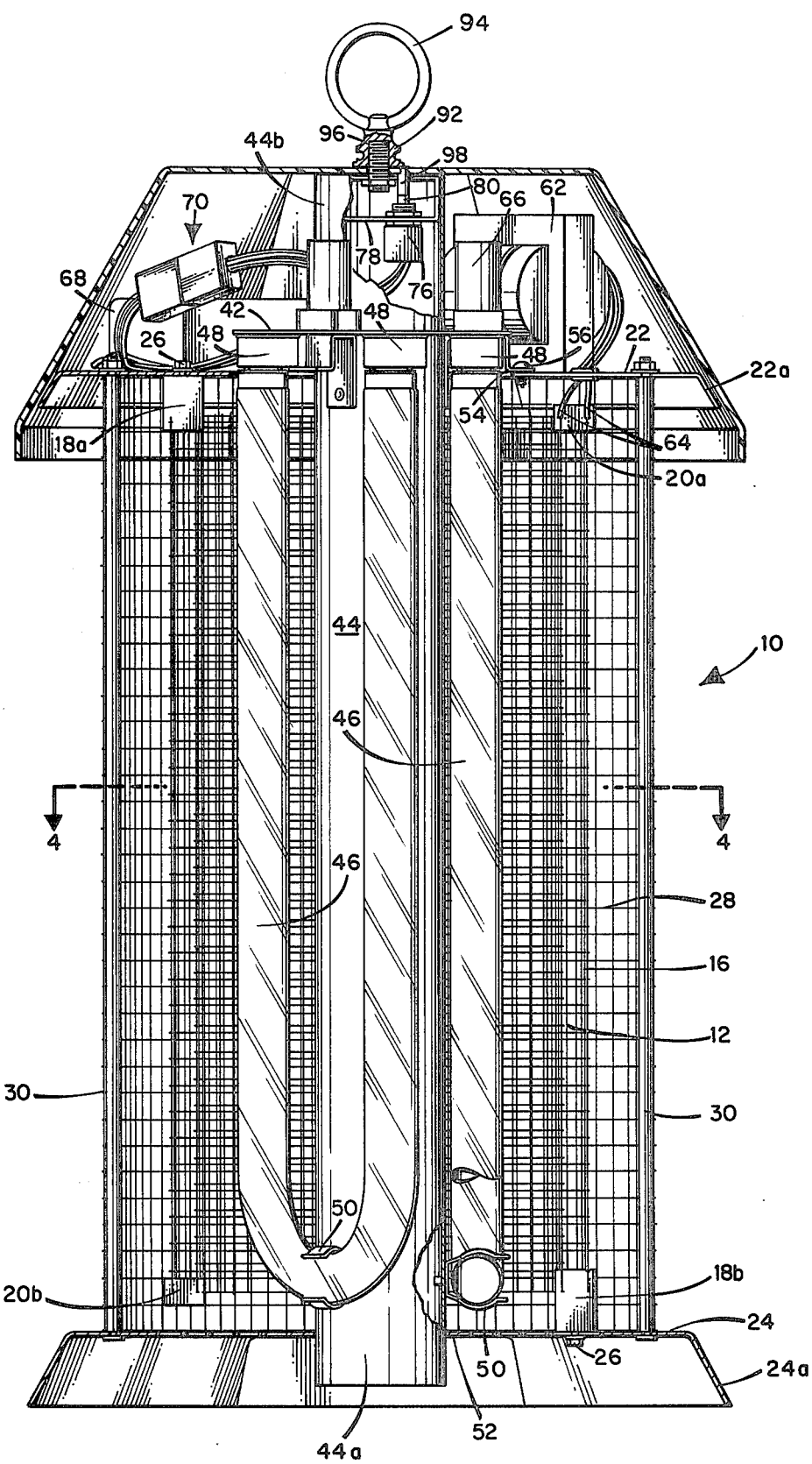
FIG. 2 is a vertical sectional view of the apparatus.

The access opening 32 in the top wall 22 is suitably dimensioned to axially receive the lower portion 44a of the reflector and the fluorescent tubes 46 when the carrier 40 is lowered from a position as shown in FIG. 3 to a position as shown in FIG. 2. The lower end of the reflector is received in a central hole 52 in the bottom wall 24 and is thus prevented from subsequently undergoing any significant lateral movement. The support plate 42 has a plurality of feet 54 which are detachably mounted on the top wall 22 by means of machine screws 56 (see FIG. 2).

Figure 5:
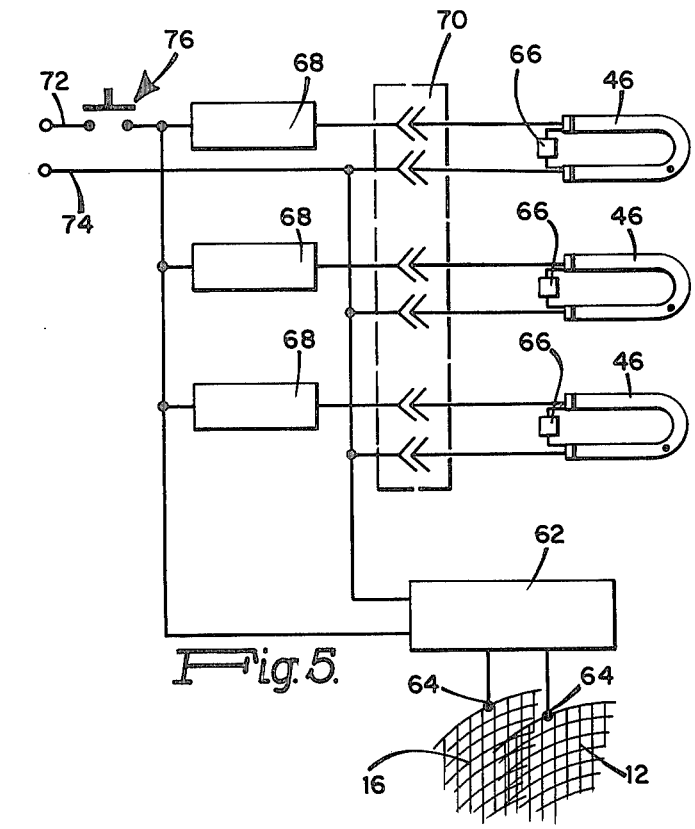
FIG. 5 is a schematic wiring diagram of the apparatus.
Figure 4:
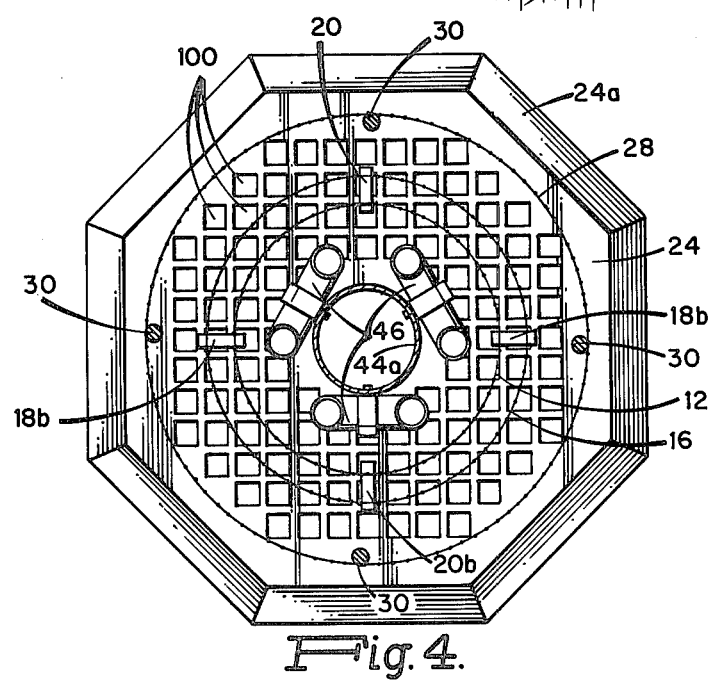
FIG. 4 is a sectional view taken along lines 4—4 of FIG. 2.

The apparatus is powered through an electrical power cord 60 (see FIG. 1) by electrical means best understood by additional reference to FIG. 5. The electrical means includes a voltage augmenting transformer 62 mounted on the upper surface of the top wall 22 and electrically connected as at 64 to the first and second conductive elements 12 and 16. A starter module 66 and a ballast 68 is associated with each fluorescent tube 46. The starter modules 66 are mounted on the upper surface of the carrier support plate 42, and the ballast 68 are mounted on the upper surface of the top wall 22. Each fluorescent tube 46 is connected to its associated ballast 68 via a detachable connector 70, which as is best shown in FIG. 3 is made up of cooperating male and female members 70a, 70b. The electrical power cord 60 is connected via lines 72, 74 to the ballasts 68 and the transformer 62. A normally open switch 76 is located in line 72. As is best shown in FIG. 2, the switch 76 is mounted on a bracket 78 fixed within the interior of the upper portion 44b of the reflector. The switch 76 has a button 80 which closes the switch when it is depressed.

A protective cover 90 is detachably mounted in an operative position overlying the top wall 22, the support plate 42, and the electrical components mounted thereon. The cover is secured in place by means of a nut 92 formed integrally with a support ring 94. The nut coacts with an upstanding threaded stub shaft 96 on the bracket 78.

The cover is interiorly provided with a depending pin 98 which extends through an appropriately positioned opening in the bracket 78 to contact and depress the operating button 80 of the switch 76 when the cover is operatively positioned as shown in FIG. 2. This closes the switch 76 and enables power to be fed to the transformer 62 and the ballasts 68 which in turn feed through the detachable connection 70 and the starter 66 to illuminate the fluorescent tubes 46.

In operation, the apparatus is suspended at any appropriate location by means of the support ring 94 and the power cord 60 is plugged into any available outlet. The illuminated fluorescent tubes 46 attract insects. The insects penetrate the exterior protective wall 28 and continue inwardly until they bridge the gap between the conductive elements 12, 16 where they are immediately electrocuted. The dead insects fall through openings 100 in the bottom wall 24. If desired, a dish or catching plate 102 (see FIG. 3) may be employed to accumulate the dead insects.

In light of the foregoing, it will now be appreciated by those skilled in the art that the present invention provides a number of advantages over known devices of this general type. For example, all electrically "live" components are safely contained within an exterior housing comprised in part of the top and bottom walls 22, 24, side wall 28 and the protective cover 90. Should it become necessary to perform maintenance on the apparatus, the first step must necessarily involve removal of the cover 90. When this is done, switch 76 opens automatically, thereby breaking the connection between the power cord 60 and the other electrical components. Thus, a shock hazard is avoided, even though the user may have inadvertently forgotten to unplug the power cord 60. The fluorescent tubes 46 are completely accessible without having to disturb the relationship of the main outer housing components, in particular the top and bottom walls 22, 24 and the conductive elements 12, 16 and side wall 28. Once the cover 90 is removed, the user need only separate the connector 70 and remove the machine screws 56. The carrier 40 may then be lifted axially out of the apparatus as shown in FIG. 3, thus exposing all of the fluorescent tubes 46 for easy maintenance. Reassembly is easily accomplished by reversing the above procedure.

The lighting efficiency of the apparatus is also markedly improved by virtue of the reflector 44. The net effect of surrounding the reflector 44 with a plurality of fluorescent tubes is to dramatically increase the amount of light projected from the apparatus with a given number of fluorescent tubes.

The use of U-shaped fluorescent tubes is also advantageous in that it enables both ends of the tubes to be received in sockets 48 which depend from the underside of the support plate 42 and are thus protected from the elements by the overlying cover 90.

It is my intention to cover all changes and modifications to the embodiment herein chosen for purposes of disclosure which do not depart from the spirit and scope of the invention as claimed.

I claim:

1. Apparatus for electrically exterminating insects, comprising: first and second electrically conductive elements surrounding an interior chamber, said first and second elements being supported in a mutually spaced relationship by insulators and being arranged between opposed vertically spaced top and bottom walls, a perforated side wall extending between and cooperating with said bottom and top walls to form a protective housing enclosing said first and second elements, said top wall having an access opening therein leading to said interior chamber, a carrier assembly having a support plate and including a integral components a tubular light reflector surrounded by a plurality of detachable fluorescent light sources, means for removably mounting said carrier assembly on said top wall with said reflector and said light sources protruding through said access opening into said interior chamber, electrical means for connecting said light sources and said first and second elements to an electrical power cord, said electrical means comprising a voltage augmenting transformer mounted on the upper surface of said top wall and electrically connected to said first and second elements, a starter module and a ballast for each light source, said starter modules being mounted on the upper surface of said support plate and said ballasts being mounted on the upper surface of said top wall, separable connection means arranged between said starter modules and said ballasts for accommodating removal of said carrier assembly, and a protective cover detachably mounted in an operative position overlying said electrical means.

2. The apparatus of claim 1 wherein said electrical means includes a normally open switch which is held in a closed condition by said operatively positioned protective cover, the arrangement of said switch being such that the circuit between said power cord and both said light sources and said first and second elements is broken when said cover is removed.

3. The apparatus of claim 1 wherein one end of said tubular light reflector is axially received in an opening in said bottom wall.

4. The apparatus of claim 1 wherein said top and bottom walls are held in opposed spaced relationship by rod members extending therebetween and located within the confines of said side wall.

5. The apparatus of claim 4 wherein said side wall is confined axially between said top and bottom walls and supported radially by said rod members.

6. Apparatus for electrically exterminating insects, comprising: a first conductive element surrounding an interior chamber, a second conductive element surrounding said first conductive element, said first and second conductive elements being fabricated of a perforated material and being supported in a mutually spaced relationship by insulators which are in turn supported on opposed top and bottom end walls, a perforated side wall cooperating with said top and bottom walls to form a protective housing enclosing said conductive elements, said top wall having an access opening therein leading to the interior chamber surrounded by said first conductive element, a carrier having at least one U-shaped fluorescent light source, means for detachably mounting said carrier on said top wall with said light source protruding through said access opening into said interior chamber, a voltage augmenting transformer mounted on said top wall and electrically connected to said first and second conductive elements, a starter module and a ballast for each light source, the starter module being mounted on the carrier and the ballast being mounted on said top wall with a detachable connection between each ballast and its associated starter module, circuit means including a normally open switch for connecting said transformer and said ballast to a common power source, and a protective cover removably mounted in an operative position overlying said first end wall, said switch being held in a closed condition by said operatively positioned cover.

* * * * *